Feb. 8, 1966  R. B. MORTON  3,233,587
ELECTROPHOTOGRAPHIC BRUSH ASSEMBLY
Filed Oct. 9, 1962
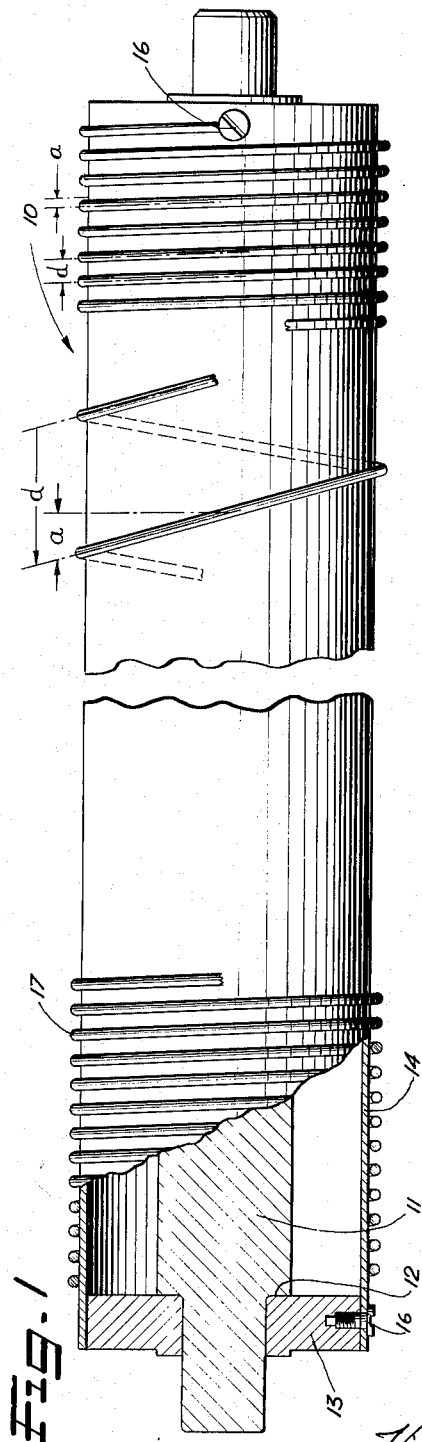
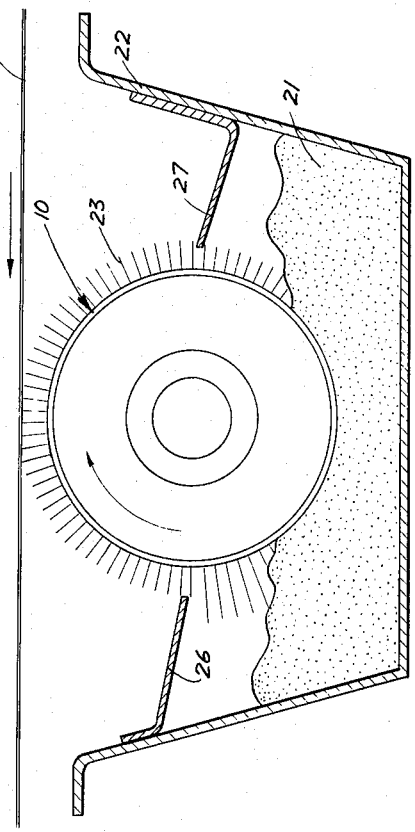
INVENTOR.
Robert B. Morton
BY
ATTORNEYS

United States Patent Office 3,233,587
Patented Feb. 8, 1966

3,233,587
ELECTROPHOTOGRAPHIC BRUSH ASSEMBLY
Robert B. Morton, Chicago, Ill., assignor to Bell and Howell Company, a corporation of Illinois
Filed Oct. 9, 1962, Ser. No. 229,505
6 Claims. (Cl. 118—637)

The present invention deals with an improved electrophotographic brush assembly of the type employed in xerography.

In xerographic processes, an electrostatic latent image is produced on a surface. This charged surface is then treated with an electroscopic material by means of electrostatic attraction to thereby form a visible image of electroscopic particles corresponding to the original latent image. In another form of process, the electrostatic charge pattern is transferred to an insulating film and the electroscopic particles are deposited thereon to form the visible image. In either case, the visible image may be transferred to a second surface to form a xerographic print.

In the past, the usual process for applying the developer to the latent electrostatic image involved the use of a finely divided colored material called a toner deposited on a slightly more coarsely divided material called a carrier. This developer mixture was then cascaded across the electrostatic image area. The toner and carrier were rubbed against each other while thus being applied, imparting an electrostatic charge to each other by triboelectric charging. To produce a positive of the electrostatic image, a toner and carrier were selected such that the toner was charged to a polarity opposite to that of the electrostatic image while the carrier was charged to the same polarity as the electrostatic image. Thus, when a carrier particle carrying with it oppositely charged particles of toner crossed an area on the image surface having an electrostatic charge, the charge on the image surface exerted a greater attraction for the toner than the carrier and retained the toner in the charged area and separated it from the carrier particles. The carrier particles, being oppositely charged and having greater momentum by virtue of their greater mass were not retained by the charged areas of the plate. When a carrier particle carrying toner particles passed over a non-charged area of the plate, the electrostatic attraction of the carrier particles for the toner particles was sufficient to retain the toner on the carrier preventing deposition in such areas.

A more recent development makes use of a developer mixture containing a toner and a ferromagnetic carrier material which is contacted with a magnet so that bristle-like projections are formed on the magnetic surfaces. The brush made up of a large number of these bristles is then passed over the surface bearing the latent electrostatic image so that the brush contacts the surface. The developer is then both triboelectrically charged and deposits on the electrostatic image in the same manner as when the toner and carrier mixture is cascaded across the image bearing surface.

The present invention is particularly directed to improvements in the design of xerographic brush assemblies. Heretofore, such brush assemblies were frequently complex mechanically and were not always satisfactory in performance. The principal reason for the latter resulted in the inability to vary the field pattern of the magnetic field associated with the brush. The height of the bristle which ultimately depends on the field pattern was not capable of variation so that a given brush assembly was usable under optimum performance conditions only in a particular machine having a particular linear speed of paper travel. Since the linear speed of the xerographic duplicating machine may vary from machine to machine depending upon the side of the copy medium, each xerographic developer required a xerographic brush assembly particularly designed for it.

The present invention provides an improved xerographic brush assembly which minimizes the problems heretofore encountered in the xerographic brush manufacture and considerably increases the flexibility of xerographic brush design. The xerographic brush assembly of the present invention lends itself very aptly to changes in magnetic field pattern which may be required to suit the developing conditions existing in a particular machine. In addition, the mechanical structure of the xerographic brush assembly of the present invention is considerably simplified over comparable structures used in the past, making the brush assembly considerably more economical to manufacture and to replace, if necessary.

One of the objects of the present invention is to provide an improved xerographic brush assembly whose magnetic field pattern can be adjusted at will in a very convenient manner to insure opitmum transfer of toner and carrier particles onto the latent electrostatic image.

A further object of the invention is to provide an improved xerographic brush assembly which lends itself to adjustment of the bristle size, thereby making it considerably easier to correlate the bristle size with the speed of the copy medium.

Still another object of the invention is to provide an improved xerographic developing assembly including the improved brush of the present invention.

In accordance with the present invention, I provide a xerographic brush which includes a non-magnetic surface, normally in the form of a cylinder or the like, and a helically wound permanent magnet wire on the periphery of the cylinder, the spacings between the convolutions of the helix being predetermined in accordance with the magnetic field pattern required in the particular xerographic developing apparatus. When I speak of a "wire" I do so in the broad sense, referreing to an elongated filament, regardless of the cross-sectional geometry which may be round, rectangular, square, or any other shape suited to the particular installation. With the adjustable spacing between the convolutions inherently present in this structure, it is possible to control the configuration of the magnetic flux and thereby also control the height of the bristles of the developer mixture which extend radially outwardly of the brush. It is, therefore, possible to provide a desired field pattern in the xerographic brush correlated to the speed of the paper or other variables existing in the assembly.

A further description of the present invention will be made in conjunction with the attached sheet of drawings which illustrate a preferred embodiment thereof.

In the drawings:

FIGURE 1 is a view in elevation and partly in cross-section of a xerographic brush embodying the improvements of the present invention; and FIGURE 2 is a fragmentary view of a xerographic developing assembly employing the improved brush of the present invention.

As shown in the drawings:

In FIGURE 1, reference numeral 10 indicates generally a xerographic brush produced according to the present invention. The brush 10 includes a shaft 11 composed of aluminum or the like, the shaft 11 having a radial shoulder 12 against which an end plate 13 composed of a non-magnetic material such as brass or the like is secured. To the end plate 13 there is secured a non-magnetic cylinder or tube 14 also composed of brass or the like, the tube 14 being secured to the end plate 13 by means of screws 16.

The magnetic field producing element consists of a helical winding 17 composed of a permanent magnet material of any desired cross-sectional configuration. I prefer to use a material such as "Cunife" wire which is a ductile permanent magnet material containing about 60% copper, about 20% nickel, and about 20% iron. The ends of the winding 17 may be conveniently secured to the screws 16.

The winding 17 is applied to the tube 14 with sufficient spacing between the convolutions of the winding 17 to provide a desired field strength for the particular xerographic developing assembly. By spacing the convolutions close together, a more intense field is obtained with the result that a greater concentration of the developer powder will be picked up by the brush; increasing the spacing between the convolutions decreases the field intensity and provides shorter bristles of developing powder spaced farther apart.

The xerographic brush 10 is rotatably mounted in a suitable support as illustrated in FIGURE 2 so that it is partially immersed in a mixture 21 of toner particles and ferromagnetic carrier particles. The mixture 21 is confined within a holder 22 consisting of a trough. As the magnetic periphery of the brush 10 rotates through the mixture 21, it picks up the developer mixture at its periphery in the form of radially extending bristles 23. These bristles then contact a moving paper web 24 on which there is a latent electrostatic image to be developed. As indicated in FIGURE 2, the periphery of the brush 10 rotates in a direction opposite to that of the travel of the paper web 24 (indicated by arrow) so that the bristles 23 are rubbed against the surface of the paper 24 with a uniform distribution of the developing powder against the paper. In order to assure that the heights of the bristles will be uniform, the assembly may be provided with a pair of trimmer blades 26 and 27 on opposite sides of the brush 10 and spaced therefrom. The trimmers 26 and 27 act in the manner of doctor blades to trim off excess developing powder from the bristles so that a uniform bristle height is always presented to the paper.

By varying the helix angle $a$ or the spacing dimension $d$ between the convolutions helically wound coils of the wire, the xerographic brush of the present invention provides a convenient means for predetermining or adjusting the magnetic field pattern of the brush for optimum operation in a particular xerographic developing system. The improved brush is relatively inexpensive to manufacture and to maintain. It should also be evident that various modifications can be made to the described embodiments without departing from the scope of the present invention.

I claim as my invention:

1. An electrostatographic brush assembly comprising
   means forming a generally cylindrical non-magnetic surface,
   and a permanent magnetic continuous helical wire wrapped around said surface disposed and shaped in the form of a plurality of circumferentially extending helical wrappings of greater than 360° and all said wrappings forming an axial row of convolutions separated from one another by an axial spacing dimension selected to form a magnetic field of desired strength,
   and means for supplying developer mixtures to the field to form radially extending bristles of developer mixture on said surface.

2. An electrostatographic brush assembly as defined in claim 1, said means forming said surface comprising
   a rotatable shaft,
   and a non-magnetic cylinder on said shaft rotatable on the axis thereof and forming said surface.

3. A xerographic developing assembly comprising a powder holder, a mixture of toner particles and ferromagnetic carrier particles in said holder, and a rotatable brush assembly supported with a portion of its periphery immersed in said mixture, said brush assembly comprising a non-magnetic cylinder and a continuous helically wound permanent magnet wire on the periphery of said cylinder to pick up developer mixtures at its periphery in the form of radially extending bristles, said wire being shaped and disposed to form an axial row of circumferentially extending convolutions extending through 360° of arc, and fastening means connecting the respective ends of said wire adjacent respective ends of said cylinder.

4. A xerographic developing assembly as defined in claim 3 and further characterized by
   a trimming means spaced from the periphery of said wire and operable to trim said bristles to a substantially uniform height.

5. A xerographic developing assembly as defined in claim 3 and further characterized by
   spacings between the convolutions of the helically wound wire being predetermined in accordance with the magnetic field pattern required.

6. An electrostatographic brush assembly comprising
   means forming a generally cylindrical non-magnetic surface, and a permanent magnetic continuous helical wire wrapped around said surface to form an axial row of circumferentially extending convolutions extending through at least 360° of arc,
   means forming a container for presenting a supply of particulated developer mixture to said field,
   means for rotating said surface around its axis, thereby to move said wire through said container and forming a xerographic brush of bristle-like projections
   the height of said bristle-like projections being controlled by the predetermination of the axial spacing dimension between said convolutions.

References Cited by the Examiner

UNITED STATES PATENTS

| | | | |
|---|---|---|---|
| 368,804 | 8/1887 | Baker | 242—9 |
| 1,338,133 | 4/1920 | Honda | 148—101 X |
| 2,118,179 | 5/1938 | Ellis et al. | 148—101 |
| 2,598,760 | 6/1952 | Cobb | 148—101 X |
| 2,982,888 | 5/1961 | Whearley | 317—158 |
| 3,060,353 | 10/1962 | Shansky et al. | 336—213 |
| 3,081,737 | 3/1963 | Frantz et al. | 118—637 |
| 3,098,765 | 7/1963 | Keller et al. | 117—17.5 X |
| 3,133,015 | 5/1964 | Cavanaugh et al. | 209—219 X |

FOREIGN PATENTS

| | | |
|---|---|---|
| 121,080 | 3/1946 | Australia. |
| 404,894 | 1/1934 | Great Britain. |
| 558,396 | 1/1944 | Great Britain. |

CHARLES A. WILLMUTH, *Primary Examiner.*

W. D. MARTIN, *Examiner.*